(12) United States Patent
Paul et al.

(10) Patent No.: US 11,072,481 B2
(45) Date of Patent: *Jul. 27, 2021

(54) CONTAINER WALL WITH FUSIBLE MATERIAL AND METHOD FOR ADDING THE FUSIBLE MATERIAL TO THE CONTAINER WALL

(71) Applicant: Tempra Technology, Inc., Bradenton, FL (US)

(72) Inventors: Zbigniew R. Paul, University Park, FL (US); Cullen M. Sabin, Bradenton, FL (US); Michael Sheppard Bolmer, Maple Grove, MN (US)

(73) Assignee: Tempra Technology, Inc., Bradenton, FL (US)

( * ) Notice: Subject to any disclaimer, the term of this patent is extended or adjusted under 35 U.S.C. 154(b) by 631 days.

This patent is subject to a terminal disclaimer.

(21) Appl. No.: 14/796,186

(22) Filed: Jul. 10, 2015

(65) Prior Publication Data

US 2015/0314943 A1    Nov. 5, 2015

Related U.S. Application Data

(63) Continuation of application No. 12/513,905, filed as application No. PCT/US2007/083602 on Nov. 5, 2007, now Pat. No. 9,108,789.
(Continued)

(51) Int. Cl.
*B65D 81/34* (2006.01)
*B32B 1/02* (2006.01)
(Continued)

(52) U.S. Cl.
CPC .......... *B65D 81/3484* (2013.01); *B29C 39/10* (2013.01); *B29C 41/10* (2013.01);
(Continued)

(58) Field of Classification Search
CPC ........ H05B 6/06; B65D 81/3484; A47J 36/28; F24J 1/00
(Continued)

(56) References Cited

U.S. PATENT DOCUMENTS 2,131,319 A    9/1938    Greenholtz et al.
3,694,609 A    9/1972    Kennedy
(Continued)

FOREIGN PATENT DOCUMENTS

DE    202005009978    4/2006
WO    2005108878    4/2006

OTHER PUBLICATIONS

Written Opinion of the International Searching Authority and International Search Report from corresponding PCT Application No. PCT/US2007/083602.

*Primary Examiner* — Erin E McGrath
(74) *Attorney, Agent, or Firm* — Sheehan Phinney Bass & Green PA

(57) ABSTRACT

A metallic product compartment of a single-use, self-heating container has melted onto one or more of its surfaces and re-solidified a shaped fusible material containing a reaction suppressant. A method of manufacturing includes providing the product container, positioning the fusible material, as a solid, in contact with a metallic wall of the container, heating at least a portion of the metallic wall with an electromagnetic induction heater to at least partially melt a portion of the fusible material, and enabling the melted portion of the fusible material to cool and re-solidify, thereby adhering the fusible material to the metallic wall.

27 Claims, 5 Drawing Sheets

Related U.S. Application Data

(60) Provisional application No. 60/864,723, filed on Nov. 7, 2006.

(51) Int. Cl.

| | | |
|---|---|---|
| *B32B 15/08* | (2006.01) | |
| *H05B 6/06* | (2006.01) | |
| *B29C 39/10* | (2006.01) | |
| *B29C 41/10* | (2006.01) | |
| *B29C 45/14* | (2006.01) | |
| *B29C 41/20* | (2006.01) | |
| *B29K 19/00* | (2006.01) | |
| *B29K 705/00* | (2006.01) | |
| *B29L 31/00* | (2006.01) | |

(52) U.S. Cl.
CPC .......... *B29C 45/14778* (2013.01); *B32B 1/02* (2013.01); *B32B 15/08* (2013.01); *H05B 6/06* (2013.01); *B29C 41/20* (2013.01); *B29K 2019/00* (2013.01); *B29K 2705/00* (2013.01); *B29L 2031/712* (2013.01); *B32B 2439/70* (2013.01); *Y10T 428/12* (2015.01); *Y10T 428/13* (2015.01)

(58) Field of Classification Search
USPC ......... 219/600, 603, 633; 126/263.05–263.1; 206/219, 222
See application file for complete search history.

(56) References Cited

U.S. PATENT DOCUMENTS

| | | | |
|---|---|---|---|
| 4,171,066 A | | 10/1979 | Hirose |
| 4,501,259 A | * | 2/1985 | Apellaniz ............... A47J 36/28 126/263.09 |
| 4,783,233 A | * | 11/1988 | Yasumuro ............... B21D 51/26 156/227 |
| 4,940,786 A | | 7/1990 | Duff |
| 5,135,781 A | | 8/1992 | Schluckebier et al. |
| 5,139,236 A | | 8/1992 | Mankins |
| 5,255,812 A | | 10/1993 | Hsu |
| 5,368,798 A | | 11/1994 | Mizukoshi et al. |
| 5,461,867 A | | 10/1995 | Scudder et al. |
| 5,626,022 A | | 5/1997 | Scudder et al. |
| 5,628,304 A | | 5/1997 | Freiman |
| 5,809,786 A | | 9/1998 | Scudder et al. |
| 5,834,673 A | * | 11/1998 | Gustavsson ............... F42B 5/24 86/1.1 |
| 5,941,078 A | | 8/1999 | Scudder et al. |
| 5,960,976 A | | 10/1999 | Tsuno |
| 6,079,405 A | | 6/2000 | Justo |
| 6,105,384 A | | 8/2000 | Joseph |
| 6,123,065 A | | 9/2000 | Teglbjarg |
| 6,141,970 A | | 11/2000 | Molzahn et al. |
| 6,178,753 B1 | | 1/2001 | Scudder et al. |
| 6,266,879 B1 | | 7/2001 | Scudder et al. |
| 6,338,252 B1 | | 1/2002 | Calderaio |
| 6,564,558 B1 | | 5/2003 | Seymour |
| 6,819,704 B2 | | 11/2004 | Fishman et al. |
| 6,829,902 B1 | | 12/2004 | Claydon |
| 6,877,504 B2 | * | 4/2005 | Schreff ................ A47J 27/002 126/263.09 |
| 6,880,550 B2 | | 4/2005 | Miller et al. |
| 7,025,055 B2 | | 4/2006 | Scudder et al. |
| 7,117,684 B2 | | 10/2006 | Scudder et al. |
| 7,446,288 B2 | | 11/2008 | Boege et al. |
| 7,878,188 B2 | | 2/2011 | Barksdale |
| 8,242,420 B2 | | 8/2012 | Fishman |
| 8,481,893 B2 | | 7/2013 | Rosenbloom et al. |
| 8,555,870 B2 | | 10/2013 | Coffey et al. |
| 8,783,244 B2 | | 7/2014 | Ford et al. |
| 2001/0039947 A1 | | 11/2001 | Searle |
| 2002/0129610 A1 | | 9/2002 | Searle |
| 2002/0159498 A1 | | 10/2002 | Fishman |
| 2003/0205224 A1 | | 11/2003 | Kolb |
| 2004/0017838 A1 | | 1/2004 | Fishman et al. |
| 2004/0233965 A1 | | 11/2004 | Fishman et al. |
| 2005/0160743 A1 | | 7/2005 | Dunwoody |
| 2005/0198969 A1 | | 9/2005 | Scudder et al. |
| 2006/0086097 A1 | | 4/2006 | Guida |
| 2006/0162344 A1 | | 7/2006 | Scudder et al. |
| 2007/0006872 A1 | | 1/2007 | Strachan |
| 2007/0163569 A1 | | 7/2007 | Strachan |
| 2007/0167340 A1 | * | 7/2007 | Barthel ................ C11D 17/042 510/220 |
| 2007/0170178 A1 | | 7/2007 | Segiet et al. |
| 2007/0261692 A1 | | 11/2007 | Bolmer et al. |
| 2009/0159591 A1 | | 6/2009 | Tomita et al. |
| 2009/0233249 A1 | | 9/2009 | Taylor |
| 2014/0157795 A1 | | 6/2014 | Joseph |

\* cited by examiner

CONTAINER WALL WITH FUSIBLE MATERIAL AND METHOD FOR ADDING THE FUSIBLE MATERIAL TO THE CONTAINER WALL

CROSS-REFERENCE TO RELATED APPLICATIONS

This application is a continuation of U.S. patent application Ser. No. 12/513,905, entitled Method for Adding a Fusible Material to a Container Wall, which was filed on Jun. 4, 2010. U.S. patent application Ser. No. 12/513,905 was a national phase entry of PCT/US2007/083602, which was filed Nov. 5, 2007, which claimed the benefits of and priority to U.S. Provisional Patent Application Ser. No. 60/864,723, which filed on Nov. 7, 2006. The disclosure of each prior application is incorporated herein by reference in its entirety.

TECHNICAL FIELD

This invention relates to the field of containers, including but not limited to self-heating containers powered by single-use chemical heaters.

BACKGROUND

Fusible materials that melt upon heating and resolidify upon subsequent cooling are well known. They may be natural, for example wax, or synthetic, for example thermoplastic or glass. Metallic containers of a wide variety of shapes and constructions are also known. Self-heating product containers with single-use chemical heaters and employing user-initiated chemical heating are well known. U.S. Pat. Nos. 5,461,867 and 5,626,022, for example, disclose single-use heaters employing the exothermic hydration of calcium oxide. U.S. Pat. No. 5,035,230 discloses single-use heaters employing the reaction of a polyol fuel such as ethylene glycol with an oxidizing agent such as potassium permanganate.

Following activation by a user to cause the mixing of reaction components, chemical heaters produce a fixed quantity of heat and thereby cause a temperature rise dependent on the rate of heat generation by the reaction and the rate of heat loss from the heater to the product being heated and, to one extent or another, to the surroundings. Depending on the chemical reaction employed, there are methods and materials that may be employed in heater manufacture to tailor the rate and duration of an exothermic reaction to achieve a desired magnitude of temperature rise in the product being heated.

SUMMARY

For certain uses known chemical heaters have commercial deficiencies and, in some cases, potential safety problems. For example, a self-heating container that increases a product's temperature by a fixed amount will yield a final product temperature starting at 0.degree. C. ambient that is about 20.degree. C. lower than the final product temperature achieved starting at 20.degree. C. ambient. If the heater for that container and product is sized to produce a desired product temperature starting from 20.degree. C. ambient, the product temperature may be unacceptably low if the ambient temperature drops to 0.degree. C. Conversely, if the heater is sized to produce the desired product temperature starting from 0.degree. C. ambient, the product temperature may be unacceptably high if the ambient temperature increases to 20.degree. C. An unacceptably high product temperature may pose a scalding risk. Unacceptably high product temperatures and container temperatures also may result from partial or complete absence of product resulting from premature product removal or spillage, which is particularly a risk for a liquid product such as a beverage or a soup. Without the heat sink provided by the product being heated, the temperature in the reaction chamber of the heater may rise to a level at which reactants or reaction products or the reaction chamber itself degrade. The temperature level may be moderated to a degree in such situations by including water in the reaction mixture, thereby holding the temperature to the boiling point until all water is evaporated. Even so, extreme temperature excursions may cause the container to become sufficiently hot to pose a burn risk to the user. Further, including sufficient water in the reaction to absorb through its boiling all the heat generated tends to reduce the rate of heat generation to an unacceptably low level during normal operation.

Certain heaters, such as the heater disclosed in published international patent application WO 2005/108878, which is incorporated by reference herein in its entirety, moderate and suppress heat generation by, in response to a selected temperature condition associated with overheating, automatically releasing a suppressant composition into the heat-generating chamber. One disclosed way to do this was to include a suppressant composition in a fusible material such as wax, and to press the wax onto an exposed surface of the heat generating chamber, where it could fuse, or melt, in response to the surface reaching a selected temperature and drop into the heat-generating mixture.

Such systems have applicability to self-heating product containers, including but not limited to food containers and beverage containers. Such containers have a product compartment and a heater compartment that share a heat-transfer wall. Typically a product compartment resides above a heater compartment, and the heat-conducting bottom or lower wall portion of the product compartment serves as the top of the heater compartment. Fusible, suppressant-containing material may be pressed onto the outside of such product compartment portion. In response to the product compartment reaching a selected temperature associated with overheating, the fusible material melts and drops into the reaction mixture in the heater compartment, and the suppressant thereupon moderates or suppresses the ongoing exothermic chemical reaction. It has been found, however, that pressing the fusible material onto the product-compartment wall may not in all cases prevent the fusible material from releasing prematurely from the surface, thereby injecting suppressant into the reaction when it is desired not to do so.

The present disclosure relates to a method for adhering shaped fusible materials to metallic container walls. In this application "fusible material" means a material that is a solid at room temperature that may be melted by increasing its temperature and resolidified by then lowering its temperature. In other words, a "fusible material" is a normally solid material that is reversibly liquefiable by changing its temperature. In this application "shaped" has its normal meaning of made into a desired three-dimensional object, for example, a complete or partial ring, a patch or a strip. In this application "metallic" means metal or sufficiently metal-containing to be heatable by an induction heater. Examples of the latter include, for example, metal-filled resins and metal-filled vitreous products. In this application "container" is used in its normally broad sense of a receptacle capable of holding a solid, liquid or gaseous product. A container may be of any of a wide variety of shapes, for example, spherical, conical, cylindrical, or rectangular. A container may be open, as a drinking cup, or openable, as a can of soup.

One embodiment of containers to which the method of this invention is applicable is self-heating product containers. Self-heating product containers include separate compartments for a product (a product container) and for a user-initiated exothermic chemical reaction. The compartments are thermally coupled such that heat of reaction is transferred to product in the product compartment or compartments. Thermal coupling is achieved by having the two types of compartments share a major common wall capable of heat transfer. A preferred embodiment includes an inner product compartment and an outer reaction compartment such as occurs with nested cups or bowls, that is, the arrangement of the well-known cooking implement known as a "double boiler." In such an arrangement the bottom or bottom and sides of the product container or compartment forms the top of the heating compartment. Hot vapor, generally steam, generated by the chemical reaction condenses on the common partition and transfers heat through it to the product to be heated. Metallic common walls provide a very high rate of heat transfer for rapid heating of the product. For simplicity of description and ease of understanding, the concepts described herein will be described in connection with such a preferred embodiment, it being understood that other physical arrangements of product compartments and reaction compartments and also other types of containers are useful.

In some aspects, a method is disclosed for adhering a shaped fusible material to a metallic container wall. In the embodiment of a self-heating container, a fusible material, preferably a wax ring, containing reaction suppressant is adhered to the reaction-chamber side of a common wall between a reaction chamber and a product chamber. In terms of the preferred embodiment, the fusible material is applied to a portion of the outside of the "inner cup" (product container or compartment) generally circular (that is truly circular or mildly oval) in cross section, that is to be inserted into and form the closed top of the "outer cup" (reaction compartment).

In the method of this invention the shaped fusible material is placed in contacting relationship with a metallic container wall at a temperature at which the fusible material is a solid. For example, a ring of fusible material matching or matchable to the shape of the inner cup of a self-heating product container is placed on the outside of the inner cup in a contacting relationship. The fusible ring is applied at a temperature below the melting temperature of the fusible material.

Some fusible materials may have a rather broad "melting temperature" more in the nature of a melting range. A key is that the fusible material not melt onto other than its final location on the container wall, as that would leave a deposit at a location other than the final location. In the sense of this invention, therefore, below the melting temperature means below the lowest temperature that would result in deposition of fusible material on the surface. Room temperature is a preferred application temperature, but higher temperatures can also be used. In an automated production method, a uniform application temperature is desired for uniformity of product.

The container wall, for example the inner cup, is metallic material, for a reason that will become apparent. The container may be unfilled or filled. In preferred embodiments it is filled, and in some cases it must be filled.

The ring or other shape of fusible material is surrounded by the induction coil of an induction heater. Preferably the induction coil surrounds only the portion of the container to which the shaped fusible material has been applied, for example, the ring or portion of the ring to be heated, not the entirety of the container. The heater is energized, thereby heating only the metallic wall inside the induction coil. The heated portion of the wall melts the adjacent contacting surface of the shaped fusible material. For example, if a ring of fusible material is applied in a contacting relationship to the outside of a cylindrical wall of the inner cup of a self-heating container, heating the wall portion contacting the ring melts the inner surface of the ring.

The assembly is then cooled, with the result that the shaped fusible material is adhered to the container surface by having had its contacting surface melted and then resolidified in place. It will be appreciated that to be heated in this fashion the subject wall should be capable of acting as the secondary coil of a transformer and forming heat-producing eddy currents; hence, metallic.

In one aspect, a method includes providing a product container having a metallic wall, wherein the product container is adapted to contain a product in thermal communication with a user-initiated, exothermic chemical reaction. A fusible material is positioned in contact with the metallic wall. The fusible material includes a reactant suppressant. The fusible material is heated to at least partially melt the fusible material. The at least partially melted fusible material is allowed to cool and solidify, thereby causing it to adhere to the metallic wall.

Typically, the fusible material is positioned so that when it is released from the metallic wall it can drop into and at least partially suppress the exothermic chemical reaction. In some implementations, the fusible material is positioned in contact with the metallic wall in a substantially solid form and the heating occurs after the positioning. The heating can include, for example, causing an electrical current to flow in the metallic container. Causing the electrical current to flow can include magnetically coupling an induction coil of an induction heater to the metallic wall and energizing the magnetically-coupled induction coil. In other implementations, causing the electrical current to flow can include applying a voltage across the metallic container.

In some instances, the heating occurs before the positioning and the fusible material is positioned in contact with the metallic wall in a substantially liquid form. In some of those instances, positioning the fusible material in contact with the metallic wall includes positioning a mold cavity adjacent to the metallic wall and at least partially filling the mold cavity with the substantially liquid fusible material.

In another aspect, a method is disclosed for applying a shaped fusible material to a portion of a surface of a metallic wall of a container. The method includes applying the shaped fusible material to the wall surface portion at a temperature below the melting temperature of the fusible material such that a surface of the shaped fusible material is in a contacting relationship with the wall surface. The method also includes placing the wall surface portion with the applied fusible material in an induction coil of an induction heater. The method also includes energizing the induction heater to rapidly heat the wall surface portion so as to melt the contacting surface of the fusible material against said wall surface portion. The method also includes cooling the resulting assembly so as to re-solidify the melted fusible material.

In some implementations, the wall surface portion with the applied fusible material is placed into the induction coil at the same time that the induction heater is energized. In some implementations, the container is an inner cup of a self-heating product container comprising said inner cup and an outer cup, and the shaped fusible material is applied to a portion of an outer surface of the metallic wall of said inner cup. In certain embodiments, the fusible material contains a suppressant for an exothermic chemical reaction. Some implementations include a container that is filled with a product prior to application of the fusible material. The shaped fusible material can be a ring or any other shape conforming to the shape of the wall.

Yet another aspect includes a metallic product compartment of a single-use, self-heating container having melted onto one or more its surfaces and re-solidified a shaped fusible material containing a reaction suppressant. In some implementations, the one or more surfaces include the container's outer surface. Additionally, in certain embodiments, the container is generally circular in cross section and the shaped fusible material is a ring.

In still another aspect, a method is disclosed for applying a shaped fusible material to a portion of a surface of a metallic wall of a container. The method includes applying the shaped fusible material to said wall surface portion at a temperature below the melting temperature of the fusible material such that a surface of the shaped fusible material is in a contacting relationship with said wall surface, magnetically coupling said wall surface portion in an induction coil of an induction heater, energizing the induction heater to heat said wall surface portion so as to melt the contacting surface of the fusible material against said wall surface portion and allowing the melted contacting surface of the shaped fusible material to cool and solidify.

In some implementations, the foregoing methods have important advantages. It does not deposit fusible material on the remaining container wall surface. If the entire container is heated, for example by passing it through an oven, before the fusible material is applied, application of shapes such as a ring to a cylindrical container deposits fusible material on any surface portion contacted during application. If not removed, such a deposit is undesirable. It may, for example, interfere with heat transfer during use of the container. Removal of the deposit, on the other hand, complicates the process, tends to slow production, and adds cost.

If the container is filled with product when the fusible ring or other shape is added, the method of this invention minimizes the application of heat energy, avoids distortion of the fusible shape, and avoids significant heating of the product. If a filled container is heated, for example by passing it through an oven, the input of heat energy must be increased to accommodate heat transfer from the container to the product. This is excess heat energy that during cooling will tend to distort the shape of the fusible material. Additionally, if the product is heat-sensitive, such as a beverage or food product, heating the product may have undesirable consequences. Food and beverage products are customarily loaded into product compartments (or containers), which are then sealed and heated ("retorted") to kill bacteria for safety reasons. In most embodiments of self-heating containers, fusible, suppressant-containing materials have a melting temperature making them unsuited to undergoing retorting. Hence, fusible material must be added to filled product compartments.

Heating a filled cup in an oven after a ring of fusible material is applied also has negative consequences. The need for excess heat input to melt the inner ring surface against the cup is exacerbated, increasing product heating and distortion of the shaped fusible material.

Induction heaters are controllable to achieve adherence with minimum energy input. The temperature of the container wall portion adjacent the fusible ring or other shape must be heated to a temperature above the melting temperature of the fusible material's contacting surface. It is desired to do so as quickly as possible to minimize heat input and also to speed production. It is also desired to raise the temperature of the contacting wall portion minimally above the melting temperature of the fusible material for the same reasons. Induction heaters are controllable by power input and dwell time. By adjusting these controls, which is within the skill of persons even minimally familiar with induction heaters, heating can be adjusted to achieve the foregoing goals.

As indicated above, fusible materials may have rather broad melting temperatures, or ranges. Selection of the temperature of heating can routinely be done by simple trial and error of power and dwell settings of an induction heater needed to achieve good adherence to the container wall surface. So as not to distort the fusible material's shape, not to require more than the minimum cooling time, or unnecessarily heat the product in a filled product compartment, the power and dwell will be optimized for very rapid heating of the compartment wall to a temperature sufficient to melt a thin layer of the fusible material as necessary to result in good adherence. In general this will result in the contacting surface of the shaped fusible material being heated only slightly above its melting temperature.

Fusible materials can perform a variety of physical or chemical functions during use of containers to which they are applied. For example, a fusible ring could function as a washer or o-ring. Fusible material could be shaped to form a fusible plug adapted to prevent fluid flow through an inlet or discharge unless and until the plug is melted. Fusible material could be loaded with a chemical ingredient that is to be released when the fusible material is melted, or the fusible material itself could be a chemical ingredient to be released from the container wall when it is melted. A preferred embodiment is a fusible material loaded with a reaction suppressant suitable for application to the outside of an inner cup of a self-heating product container. This embodiment is not limited to any particular fusible material. Our presently preferred material is wax, which can be tailored to have a desired melting temperature. Nor is the invention limited to any particular suppressant system. A preferred heater reaction is the oxidation of a polyol fuel with a permanganate oxidizer, and our presently preferred suppressant system for such a heater reaction is the borate system disclosed in patent application WO 2005/108878. Another well-known heater reaction is the reaction of calcium oxide with water, for which patent application WO 2005/108878 discloses that saturated sodium silicate solution is a usable suppressant system. It will be appreciated that the suppressant system must be suitable for the particular heater reaction being used.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
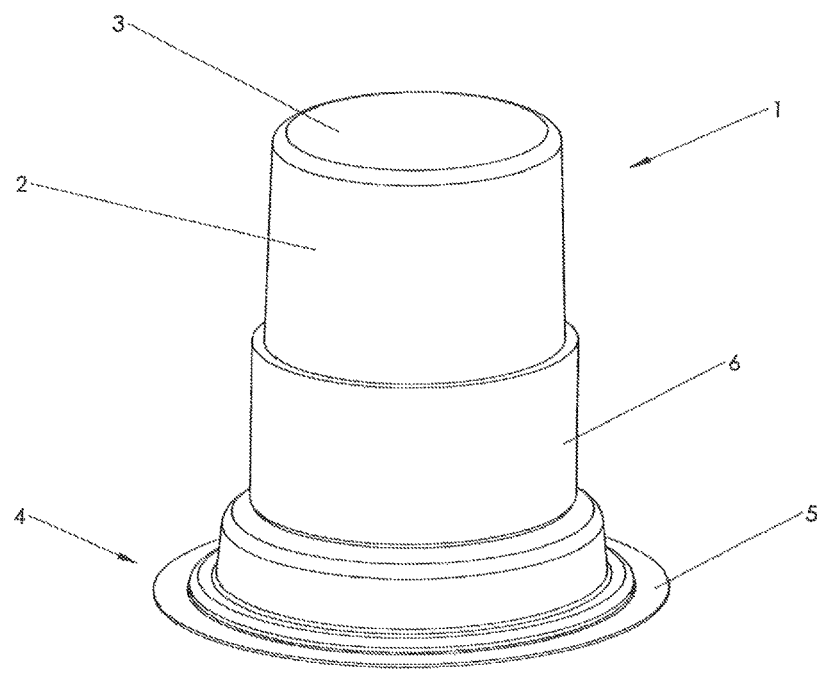
FIG. 1 is a perspective view of a container having a shaped fusible material contacting its wall.
Figure 2:
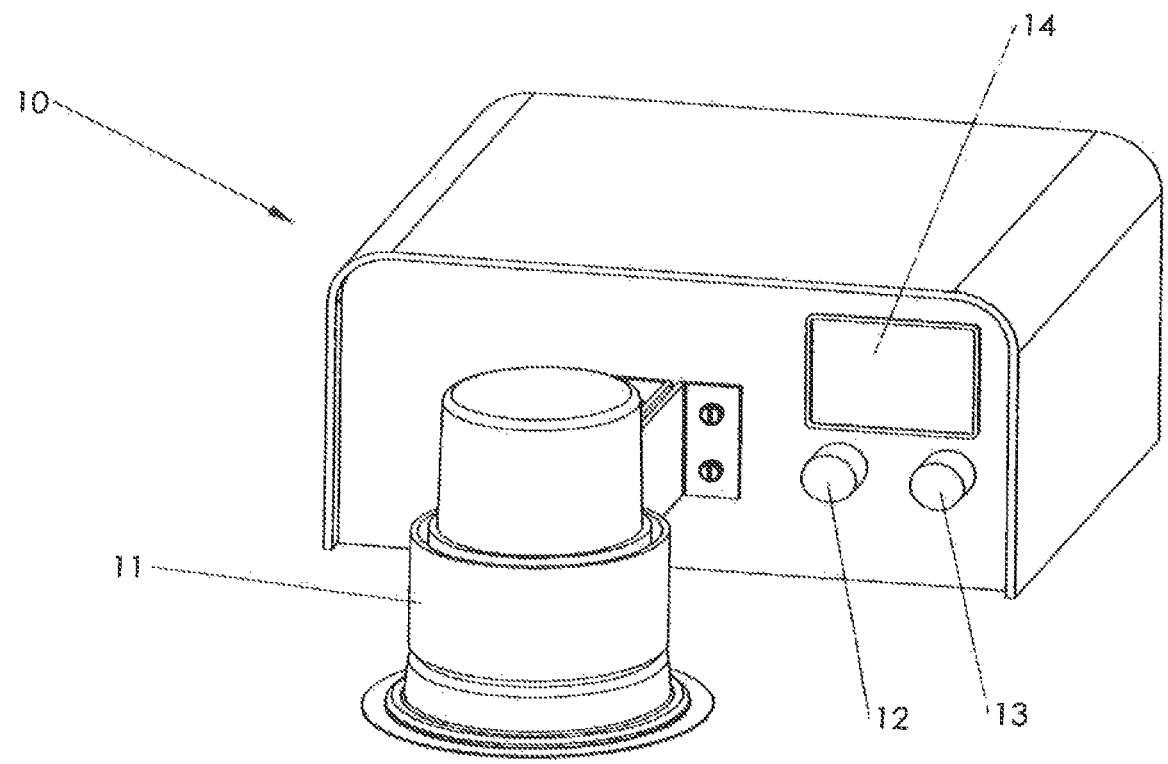
FIG. 2 shows the container of FIG. 1 within the coil of an induction heater.

FIGS. 1-2 illustrate a preferred embodiment of the method of this invention. Referring to FIG. 1 there is shown a container, in this case a metal inner cup 1 of generally circular cross section having a slightly tapered vertical wall 2, integral bottom 3, and mounting and sealing portion 4, including crimpable flange 5 for sealingly mounting inner cup 1 onto and within a somewhat larger outer cup (not shown, the two forming a self-heating container with a chemical reaction between the inner and outer cups). Cup 1 is shown in an "upside down" position, convenient for application of a fusible ring. FIG. 1 includes ring 6 of fusible material already applied in contacting relationship to the outside of vertical wall 2. In some embodiments the fusible material contains suppressant for the chemical reaction used to heat product in cup 1.

FIG. 2 shows the assembly of FIG. 1 placed within induction coil 11 of induction heater 10, which includes variable power control adjustment knob 12, variable dwell-time control adjustment knob 13, and power level and dwell display 14. As depicted in FIG. 2, induction coil 11 surrounds the full height of ring 6 (FIG. 1) so as to melt the entire inner ring surface contacting cup wall 2. In particular embodiments induction coil 11 could be shorter than ring 6 so as to melt only part of the ring's inner surface. For mass production a multiple-position heater could be utilized so as to melt multiple rings onto multiple cups simultaneously.

In carrying out a preferred method of this invention with the system shown in FIGS. 1-2, ring 6 of fusible material is first applied to the outer surface of wall 2 by sliding ring 6 downwardly from bottom 3 toward top portion 4 at the temperature below the melting temperature of the fusible material. Ring 6 is sized to fit over the widest portion of wall 2, the portion remote from bottom 3, in a contacting relationship with the wall. The assembly of cup 1 and ring 6 is placed in coil 11 of induction heater 10. Induction heater 10 is then energized to heat the portion of wall 2 within coil 11 rapidly so as to melt the inner surface portion of ring 6. In general, the induction heater 10 heats with electromagnetic induction, generating eddy currents to flow in the metal container, which results in heat. Finally the assembly is cooled, resolidifying the melted portion of ring 6, thereby adhering ring 6 to wall 2.

FIGS. 1-2 are not intended to limit the order of steps for preparing cup 1 for induction heating. The fusible ring could be applied either simultaneously with or even after the cup is placed within the induction coil but before the cup is heated. The step of cooling the cup could take place while the cup is within the induction coil as well as after the cup is removed from the coil.

As indicated previously, numerous variants of the system depicted in FIGS. 1-2 are possible within the scope of this invention. For example, the product compartment need not be conically shaped as shown for cup 1. A fusible ring can be shaped to surroundingly engage almost any shape. If the ring is deformable, such as a presently preferred ring of suppressant-containing wax, the ring can be deformed during application, for example, to contactingly engage the spherical surface of a bowl as an alternative to preparing a wax ring having the bowl's profile. A ring shape is itself not critical. Fusible material could be, for example, a solid rectangle that is press fit against a flat or shaped wall surface prior to melting. The fusible material need not entirely surround the inner or outer wall surface of a container, for example, a wall between the product compartment (or compartments) and the reaction compartment (or compartments). Similarly the coil of the induction heater need not be cylindrical. The coil could be shaped to conform to a non-circular product compartment shape. Further, the coil could be a pair of flat panels through which the ring-containing compartment is passed. Such a coil could be used to heat a cup of circular cross section, for example, by rotating the cup as it passes through the coil. Other shapes and system configurations will occur to persons in the art.

EXAMPLE

Utilizing the system generally depicted in FIGS. 1-2, a wax ring was melted and solidified onto a cup. The cup was a 290-cc cup approximately 6 cm in diameter, of approximately 0.2 mm thickness. A wax ring having a melting temperature of 67.degree. C. was prepared. The ring had a thickness of approximately 0.3 cm and a height of approximately 3.5 cm. It contained as suppressant composition for a polyol/potassium permanganate heater 10 g of borax.

The ring was slipped over the wall of an inverted cup at room temperature and lightly pressed onto the cup by hand. The ring-cup assembly was then placed within a circular induction coil of a laboratory-size, 1500 watt induction heater. If the cup was filled with water (product), melting of the ring's inner surface onto the cup surface was achieved with settings of 99% power and a dwell time of 4 seconds. If the cup was empty, melting of the ring's inner surface onto the outer surface of the cup was achieved with settings of 87% power and a dwell time of 2 seconds. It will be appreciated that substantially shorter dwell times would be required with a more powerful production-size induction heater.

Figure 3C:
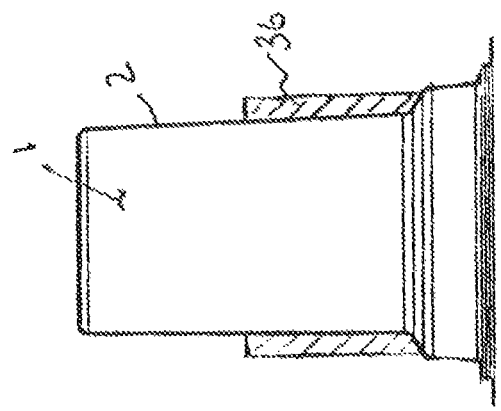
FIGS. 3A-3C include a progression of cutaway views showing a fusible material being added to a container wall.
Figure 3B:
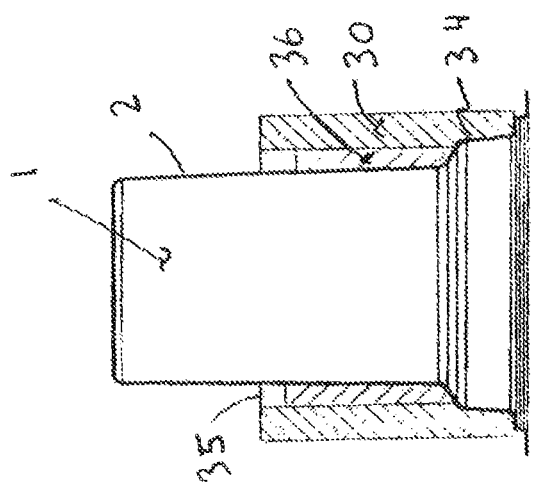
Figure 3A:
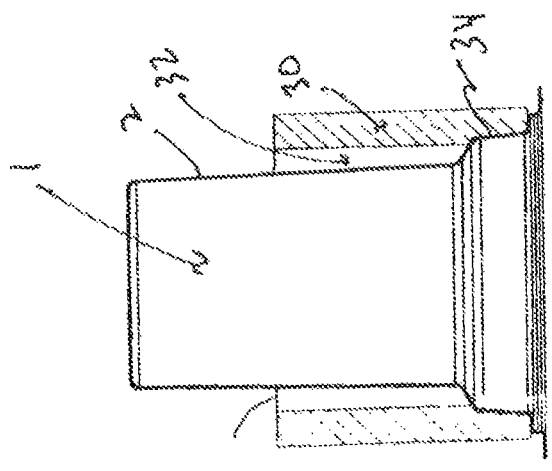

FIGS. 3A-3C show a progression of cutaway views in which a fusible material is added to a container wall. More particularly, casting is used to add the fusible material directly onto the container wall.

In FIG. 3A, the container 1 is coupled to a mold 30 to form a substantially cylindrical cavity 32 around a portion of the container wall 2. In the illustrated implementation, the container 1 is upside down and an upper portion 34 of the container 1 is substantially sealed against the mold 30 to prevent leakage out of the mold cavity 32. There is an opening 35 at an end of the mold cavity 32 opposite the seal. That opening 35 allows the introduction of fusible material.

In FIG. 3B, melted fusible material 36 is introduced into the mold cavity 32 through opening 35. More specifically, the melted fusible material 36 is poured into the mold cavity 32 in a liquid form. Prior to being poured into the mold cavity 32, the fusible material 36 is melted by applying heat to the fusible material 36. Once in the mold cavity 32, the fusible material 36 is allowed to cool and solidify, thereby causing the fusible material to take an annular form and to adhere to the container wall 2.

FIG. 3C shows the resulting assembly after the fusible material 36 has solidified and the mold 30 has been removed. As illustrated, the fusible material 36 is adhered to the container wall 2.

Figure 4A:
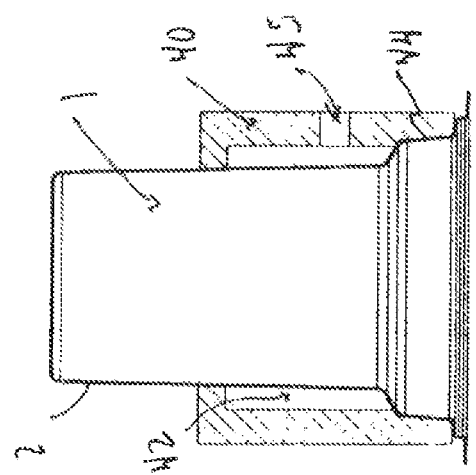
FIGS. 4A-4C include a progression of cutaway views showing a fusible material being added to a container wall.
Figure 4B:
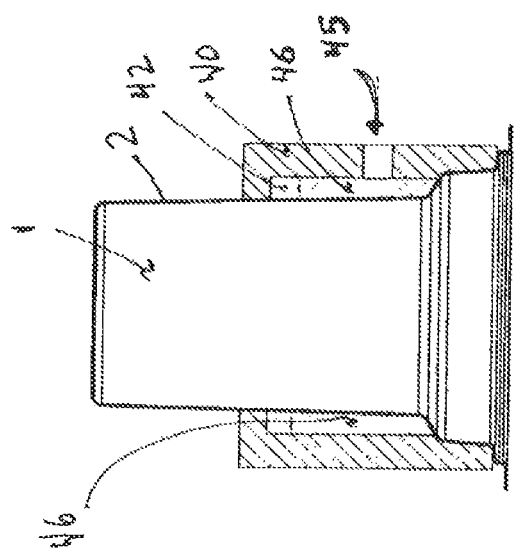
Figure 4C:
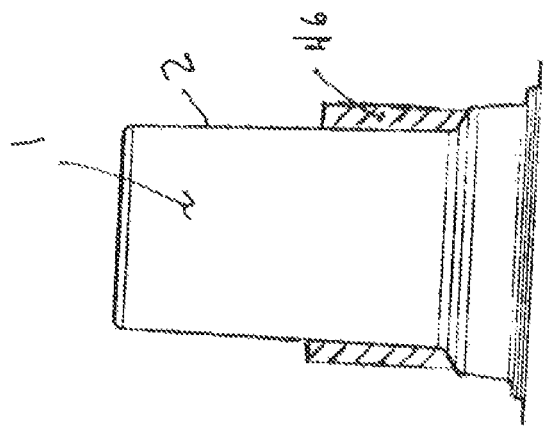

FIGS. 4A-4C show a progression of cutaway views in which a fusible material is added to a container wall. More particularly, the fusible material is injection molded to form a ring that is adhered to a portion of the container wall 2.

In FIG. 4A, the container 1 is positioned inside an injection mold 40 in a manner that forms a substantially cylindrical cavity 42 around a portion of the container wall 2. In the illustrated implementation, the container 1 is upside down and an upper portion 44 of the container 1 is substantially sealed against the mold 40 to prevent leakage out of the mold cavity 42. There is an opening 45 at a side of the mold cavity 42, through which fusible material can be introduced (i.e., injected).

In FIG. 4B, melted fusible material 46 is introduced into the mold cavity 42 through opening 45. More specifically, the melted fusible material 46 is injected into the mold cavity 42 in a liquid form. Prior to being poured into the mold cavity 42, the fusible material 46 is melted by applying heat to the fusible material 46. Once in the mold cavity 42, the fusible material 46 is allowed to cool and solidify, thereby causing the fusible material to take an annular form and to adhere to the container wall 2.

FIG. 4C shows the resulting assembly after the fusible material 46 has solidified and the mold 40 has been removed. As illustrated, the fusible material 46 is adhered to the container wall 2.

In some implementations, the mold 40 may be removed from the container by sliding off of the container 2. In some implementations, the mold may be separated into two or more pieces in order to remove it from the container 2.

Figure 5:
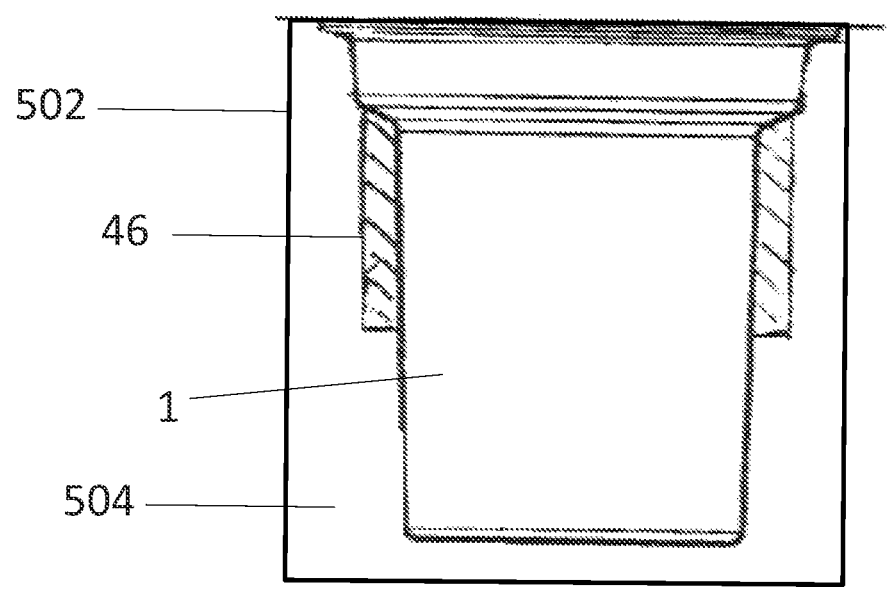
FIG. 5 is a partial, cross-sectional view showing an example of a self-heating container.

FIG. 5 is a partial, cross-sectional view showing an example of a self-heating container 500. The illustrated self-heating container 500 has an inner product container 1 that is mounted onto and within a larger outer cup 502 to define a reaction chamber 504 between the inner product container 1 and the larger outer cup 502 to accommodate a user-initiated, exothermic chemical reaction. Fusible material 46 in the illustrated implementation is positioned on an outer surface of the metallic wall of the inner product container 1.

A number of embodiments of the invention have been described. Nevertheless, it will be understood that various modifications may be made without departing from the spirit and scope of the invention. For example, a container could be placed within the coil of an induction heater before the shaped fusible material is applied, or the fusible material could be applied to the inner surface of a container wall rather than an outer surface.

Additionally, solid fusible material may be placed around a metal container so that a surface of the fusible material is in contact with a portion of the metal container. Then, a voltage may be applied to the metal container, causing current flow through the container and heat generation. The generated heat may cause the solid fusible material to at least partially melt. Then, the at least partially melted fusible material may be allowed to cool and solidify, thereby adhering to the metal container.

It should be understood that the techniques disclosed herein could be used to secure a fusible material to any surface in a heater. The surface could be, for example, either inside or outside or above the fusible material.

Accordingly, other embodiments are within the scope of the following claims.

What is claimed is:

1. A method of adhering a fusible material to an outer surface of a container wall, the method comprising:
providing a product container having a metallic wall with an inner surface and an outer surface opposite the inner surface, wherein the metallic wall has a substantially circular cross-section, wherein the product container is adapted to contain therein a food or beverage product to be heated by a user-initiated, exothermic chemical reaction;
positioning a ring of fusible material, at a temperature at which the ring of fusible material is a solid, in contact with the outer surface of the metallic wall, wherein the ring of fusible material contains or comprises a reaction suppressant for the user-initiated, exothermic chemical reaction;
positioning the product container, with the ring of fusible material positioned in contact with the outer surface of the metallic wall, within a ring-shaped induction coil of an electromagnetic induction heater, such that the induction coil of the electromagnetic induction heater surrounds the ring of fusible material;
heating a portion of the outer surface of the metallic wall with the electromagnetic induction heater such that the portion of the outer surface of the metallic wall thereby heated causes an inner annular surface of the fusible material that is in contact with the heated outer surface of the metallic wall to melt thereby producing a melted contact surface, while a solid outer annular portion of the fusible material remains in solid form;
terminating the heating before the solid outer annular portion of the fusible material melts; and
enabling the melted contact surface of the fusible material to cool and re-solidify, thereby adhering the fusible material to the outer surface of the metallic wall.

2. The method of claim 1 wherein the heating occurs after the positioning.

3. The method of claim 1 wherein the electromagnetic induction heater is operable to heat the portion of the outer surface of the metallic wall by generating electrical current in the metallic wall.

4. The method of claim 1 wherein heating the portion of the outer surface of the metallic wall with the electromagnetic induction heater comprises:
magnetically coupling the induction coil of the electromagnetic induction heater to the metallic wall; and
energizing the magnetically-coupled induction coil.

5. The method according to claim 1 wherein the fusible material is positioned on a side of the metallic wall where the exothermic chemical reaction will occur.

6. The method according to claim 1 further comprising:
filling the product container with the food or beverage product to be heated by the user-initiated, exothermic chemical reaction prior to positioning the fusible material in contact with the metallic wall.

7. The method according to claim 1 wherein the fusible material is a wax ring.

8. The method according to claim 7 wherein positioning the wax ring in contact with the metal wall of the product container comprises:
positioning the product container upside down; and
pressing the wax ring onto the product container.

9. The method of claim 1 further comprising:
adding the food or beverage product to the product container.

10. The method of claim 9 further comprising:
heating the food or beverage product with the exothermic chemical reaction.

11. The method of claim 1 wherein the product container is an inner cup of a self-heating container that comprises said inner cup and an outer cup, and wherein the fusible material is positioned on the outer surface of the metallic wall of said inner cup.

12. The method of claim 1 wherein, during the heating, at least part of the fusible material is positioned between the metallic wall and an induction coil of the electromagnetic induction heater.

13. The method of claim 1, further comprising:

mounting the container onto and within a larger outer cup to define a reaction chamber between the product container and the larger outer cup to accommodate the user-initiated, exothermic chemical reaction.

14. The method of claim 13, wherein the fusible material adheres to the metallic wall at a position such that, after the product container is mounted onto and within a larger outer cup to define a reaction chamber, when the user-initiated exothermic chemical reaction has heated the food or beverage product to a desired temperature, a bond between the fusible material and the metallic wall melts, thereby releasing the fusible material from the metallic wall to drop into the exothermic chemical reaction to at least partially suppress the user-initiated, exothermic chemical reaction.

15. The method of claim 13, wherein the user-initiated, exothermic chemical reaction is a reaction that involves oxidation of a polyol fuel with a permanganate oxidizer, and wherein the reaction suppressant comprises a borate.

16. The method of claim 13, wherein the user-initiated, exothermic chemical reaction is a reaction of calcium oxide with water, and wherein the reaction suppressant is a saturated sodium silicate solution.

17. The method of claim 1, wherein causing the adjacent contacting surface of the fusible material to melt thereby producing a melted contact surface is done in a manner that does not distort a shape of the fusible material.

18. The method of claim 1, wherein the metallic wall of the product container is cylindrical, wherein the product container is configured such that the food or beverage product is to be contained within the cylindrical metallic wall of the product container, wherein the positioning the fusible material in contact with the metallic wall comprises positioning the fusible material in contact with an outer surface of the cylindrical metallic wall such that the adjacent contacting surface that gets melted is an inwardly facing surface of the fusible material.

19. A method of adhering a shaped fusible material to an outer surface of a metallic wall surface portion of a container, wherein the container has a substantially circular cross-section and is adapted to contain a food or beverage product to be heated by a user-initiated, exothermic chemical reaction, the method comprising:

a. applying the shaped fusible material in a ring form to said outer surface of said metallic wall surface portion at a temperature below the melting temperature of the fusible material such that an inner annular surface of the shaped fusible material is in a contacting relationship with said metallic wall surface portion, wherein the shaped fusible material contains or comprises a reaction suppressant for the user-initiated, exothermic chemical reaction;

b. placing said metallic wall surface portion with applied fusible material upside down in an induction coil of an electromagnetic induction heater, such that a top of the container is facing downward, a closed bottom of the container is facing upward, and the induction coil of the electromagnetic induction heater surrounds the fusible material;

c. energizing the induction heater to heat said metallic wall surface portion so as to melt the surface of the shaped fusible material that is in a contacting relationship with said metallic wall surface portion, while maintaining a solid outer annular portion of the fusible material in solid form;

d. terminating the heating before the solid outer annular portion of the fusible material melts; and e. cooling the fusible material to re-solidify the melted fusible material, thereby adhering the fusible material to the metallic wall surface portion.

20. The method according to claim 19 wherein steps (a) and (b) are performed simultaneously.

21. The method according to claim 19 wherein the container is an inner cup of a self-heating product container comprising said inner cup and an outer cup, and the shaped fusible material is applied to a portion of an outer surface of the metallic wall of said inner cup.

22. The method according to claim 19 wherein the fusible material contains a suppressant for the exothermic chemical reaction.

23. The method according to claim 19 wherein the container is filled with the food or beverage product prior to application of the fusible material.

24. The method according to claim 19 wherein the shaped fusible material is conforming conforms to a shape of said metallic wall surface portion.

25. The method of claim 19, wherein melting the surface of the shaped fusible material that is in the contacting relationship with said metallic wall surface portion is done in a manner that does not distort a shape of the shaped fusible material.

26. The method of claim 19, wherein the melting the contacting surface of the fusible material against said portion of said surface of said metallic wall thereby producing the melted contacting surface is done in a manner that does not distort a shape of the fusible material.

27. The method of claim 1, wherein positioning the product container, with the ring of fusible material positioned in contact with the outer surface of the metallic wall, within the ring-shaped induction coil of the electromagnetic induction heater comprises positioning the product container upside-down such that a top of the container is facing downward, and a closed bottom of the container is facing upward.

* * * * *